(12) United States Patent
Marion et al.

(10) Patent No.: US 8,176,185 B2
(45) Date of Patent: May 8, 2012

(54) METHOD OF SWITCHING INTERNET PERSONAS BASED ON URL

(75) Inventors: Neal Richard Marion, Georgetown, TX (US); Shawn Patrick Mullen, Buda, TX (US); George F. Ramsay, III, Elgin, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 12/207,494

(22) Filed: Sep. 9, 2008

(65) Prior Publication Data

US 2009/0077468 A1    Mar. 19, 2009

Related U.S. Application Data

(63) Continuation of application No. 10/916,972, filed on Aug. 12, 2004, now abandoned.

(51) Int. Cl.
*G06F 15/16* (2006.01)

(52) U.S. Cl. .......................... 709/227; 709/228; 709/229

(58) Field of Classification Search .................. 709/227, 709/228, 229
See application file for complete search history.

(56) References Cited

U.S. PATENT DOCUMENTS

| | | | | |
|---|---|---|---|---|
| 6,134,548 | A * | 10/2000 | Gottsman et al. | 707/5 |
| 6,345,289 | B1 * | 2/2002 | Lotspiech et al. | 709/203 |
| 6,757,710 | B2 * | 6/2004 | Reed | 709/203 |
| 6,990,590 | B2 | 1/2006 | Hanson et al. | |
| 7,117,504 | B2 * | 10/2006 | Smith et al. | 719/328 |
| 7,330,890 | B1 * | 2/2008 | Partovi et al. | 709/224 |
| 7,373,495 | B2 * | 5/2008 | Clapper | 713/2 |
| 7,436,939 | B1 * | 10/2008 | Packingham et al. | 379/88.12 |
| 7,634,732 | B1 * | 12/2009 | Blagsvedt et al. | 715/712 |
| 2002/0006126 | A1 * | 1/2002 | Johnson et al. | 370/356 |
| 2002/0095454 | A1 * | 7/2002 | Reed et al. | 709/201 |
| 2002/0116388 | A1 * | 8/2002 | Clement et al. | 707/102 |
| 2002/0171679 | A1 * | 11/2002 | Clapper | 345/748 |
| 2003/0023880 | A1 * | 1/2003 | Edwards et al. | 713/201 |
| 2003/0126094 | A1 * | 7/2003 | Fisher et al. | 705/75 |
| 2003/0131260 | A1 * | 7/2003 | Hanson et al. | 713/201 |

(Continued)

OTHER PUBLICATIONS

Non-Patent literature (4 pages and 4 screen captures) dated Mar. 26, 2003 from Microsoft on Microsoft Internet Explorer Version 6.0 (also submitted to Applicant during the prosecution of U.S. Appl. No. 10/916,972).*

*Primary Examiner* — Abdullahi Salad
*Assistant Examiner* — Richard G Keehn
(74) *Attorney, Agent, or Firm* — Matthew B. Talpis; Jack V. Musgrove

(57) ABSTRACT

A method of communicating with a remote site on a network by establishing different user personas respectively associated with different remote sites on the network, each user persona containing one or more attributes used in accessing the remote sites, and then accessing a specific one of the remote sites using the attributes in a specific one of the user personas that is associated with the specific remote site. The specific remote site can be associated with the specific user persona by a universal resource locator (URL), e.g., for web sites on the Internet, and the accessing is automatically performed in response to matching of the URL of the specific remote site to the URL associated with the specific user persona. A default persona can be used for any remote site having no specifically associated user persona.

6 Claims, 7 Drawing Sheets

U.S. PATENT DOCUMENTS

| | | |
|---|---|---|
| 2003/0135587 A1 | 7/2003 | Fisher et al. |
| 2003/0221122 A1* | 11/2003 | Hatori .......................... 713/200 |
| 2004/0220926 A1* | 11/2004 | Lamkin et al. .................... 707/3 |
| 2005/0004978 A1* | 1/2005 | Reed et al. ...................... 709/203 |
| 2007/0074169 A1* | 3/2007 | Chess et al. .................... 717/126 |
| 2007/0100967 A1* | 5/2007 | Smith et al. .................... 709/219 |
| 2007/0118803 A1* | 5/2007 | Walker et al. .................. 715/744 |
| 2007/0128899 A1* | 6/2007 | Mayer ........................... 439/152 |
| 2008/0077983 A1* | 3/2008 | Meyer et al. .................... 726/12 |
| 2008/0082959 A1* | 4/2008 | Fowler .......................... 717/104 |

\* cited by examiner

METHOD OF SWITCHING INTERNET PERSONAS BASED ON URL

CROSS-REFERENCE TO RELATED APPLICATION

This application is a continuation of U.S. patent application Ser. No. 10/916,972 filed Aug. 12, 2004 now abandoned.

BACKGROUND OF THE INVENTION

1. Field of the Invention

The present invention generally relates to computer systems, and more particularly to a method of accessing remote sites on a network such as the Internet, where the remote sites utilize user information such as user names, passwords, etc., for access.

2. Description of the Related Art

A generalized computing network 2 is shown in FIG. 1. Network 2 has several client workstations 3a, 3b, 3c, and 3d which are interconnected via a communications infrastructure 4. Network 2 additionally has servers 5a, 5b. Each server is essentially a stand-alone computer system (having one or more processors, memory devices, and communications devices), but has been adapted to primarily provide information to individual users at client workstations 3a-3d. The information provided by a server can be in the form of programs which run locally on a given client, or in the form of data such as files used by other programs. Communications infrastructure 4 may include transmission media such as copper wires or optical fibers, along with interconnected routers, hubs and switches.

Clients 3a-3d can also be stand-alone computer systems (like personal computers, or PCs), or "dumber" systems adapted for limited use with network 2 (like network computers, or NCs). As used herein, "PC" generally refers to any multi-purpose computer adapted for use by one or more individuals, regardless of the manufacturer, hardware platform, operating system, etc. Network 2 thus offers client-server communications as well as peer-to-peer communications between different clients in real-time or by delayed file delivery. Other nodes can be included in network 2, such as a storage device 6.

The network can be local in nature, or can be further connected to other network systems (not shown). The construction of network 2 is also generally applicable to the Internet. Conventional protocols and services have been established for the Internet which allow the transfer of various types of information, including electronic mail, simple file transfers via FTP, remote computing via TELNET, "gopher" searching, Usenet newsgroups, and hypertext file delivery and multimedia streaming via the World Wide Web (WWW). A given server can be dedicated to performing one of these operations, or run multiple services. For example, mail servers (sending and receiving) can be used to facilitate the transmission of email. The Internet is becoming increasingly popular as the primary medium for both personal and commercial transactions.

Internet services are typically accessed by specifying a unique address, or universal resource locator (URL). The URL has two basic components, the protocol to be used, and the object pathname. For example, the URL "http://www.uspto.gov" (home page for the U.S. Patent & Trademark Office) specifies a hypertext transfer protocol ("http") and a pathname of the server ("www.uspto.gov"). The server name is associated with a unique numeric value (a TCP/IP address/domain). For email ("mailto:" protocol), the address is composed of two parts, a user name and a server name separated by the commercial "at" symbol, e.g., "johndoe@mailserver.com".

Various types of electronic documents can be transmitted on a network like the Internet. As illustrated in FIG. 1, a document creator at client workstation 3a uses an editor (e.g., an email composer) to draft a document such as an email 7. This email is then transmitted across the communications infrastructure 4 to the document recipient at client workstation 3b who views it with a document reader (e.g., an email viewer). FIG. 1 also depicts the delivery of a web page 8 from a remote web site hosted at server 5a to client workstation 3d. Web page 8 may be created using, e.g., a hypertext markup language (HTML) editor, and typically includes hypertext links for other web pages. A hypertext link is an image that is viewable on the workstation's display which can be selected by the user (e.g., using a pointing device or "mouse") and which then automatically instructs the client workstation to request another page associated with that particular hypertext link (i.e., issue another URL). A hypertext link may appear as a picture, or as a word or sentence, possibly underlined or otherwise accentuated to indicate that it is an embedded link and not just normal, informative text. A WWW page may have text, graphic (still) images, and even multimedia objects such as sound recordings or moving video clips. A page may be larger than the physical size of the monitor screen, and techniques such as scroll bars are used by the viewing software (the web browser) to view different portions of the page.

Different user attributes or preferences can be utilized when accessing a remote web site. For example, many web sites now use small programs, called Java applets, to carry out certain functions (such as procedures that are local to the client workstation and do not require additional access to the remote site). While Java applets can greatly enhance the capabilities of a web page, they may also introduce security and other issues. Accordingly, many web browsers are configured to allow the user to globally enable or disable the use of Java routines. This capability can, however, create problems. A user may want to explore some new web sites and, in doing so, disable Java for security reasons, but when this user visits old, reliable sites that require Java, the web pages will not be properly presented unless the user manually edits the configuration to re-enable Java. If a user repeatedly visits several web sites where Java is to be disabled, but additionally repeatedly visits web sites requiring Java, it can become very cumbersome for the user to constantly change the Java preference back and forth.

Another attribute used by conventional web browsers is the so-called "magic cookie." A cookie is an identification number or character sequence that resides locally on the client workstation but is used by the remote web site in creating a web page. When a web page is requested, the remote web site can examine the cookies to discern the user and employ previously selected options or preferences in presenting the web page. Cookies can, however, also raise security issues and may be undesirable in certain cases. Again, conventional web browsers can allow the user to globally enable or disable cookies, but the user must repeatedly change this setting for different web sites where cookies are acceptable or unacceptable.

Web browsers also allow the user to create an identity, e.g., with a username or email address, that is utilized by a remote site in accessing a web page. If a user wants to have different usernames or email addresses for different web sites, the identity information must be manually re-entered before visiting each site, which again is extremely inconvenient. For example, a user might prefer a personal email address for use with certain web sites, while preferring a work email address for other web sites, and preferring a fictitious email address for web sites that might abuse (spam) the user's email account.

In light of the foregoing, it would be desirable to devise an improved method of accessing remote sites such as web hosts which does not require the user to manually re-enter different attributes or preferences. It would be further advantageous if the method could easily allow the user to exert finer control of the privileges a remote site has.

SUMMARY OF THE INVENTION

It is therefore one object of the present invention to provide an improved method of communicating with remote network sites.

It is another object of the present invention to provide such a method which allows a user to automatically associate certain preferences or attributes with specific web sites.

It is yet another object of the present invention to provide such a method which is applicable to a variety of electronic documents including web pages and electronic mail.

The foregoing objects are achieved in a method of communicating with a remote site on a network, generally comprising the steps of establishing a plurality of user personas respectively associated with a plurality of remote sites on the network, each user persona containing one or more attributes used in accessing the remote sites, and accessing a specific one of the remote sites using the attributes in a specific one of the user personas that is associated with the specific remote site. The specific remote site can be associated with the specific user persona by a universal resource locator (URL) of the remote site, e.g., for web sites on the Internet, and the accessing is automatically performed in response to matching of the URL of the specific remote site to the URL associated with the specific user persona. A default persona can be used for any remote site having no specifically associated user persona. The attributes in the user personas can provide various functions such as indicating whether Java programming is enabled for the specific remote site or whether "cookies" are enabled for the specific remote site. The attributes can also define a username for the specific remote site. A user persona can be established when a bookmark is created for the specific remote site.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

Description of the Preferred Embodiment(s)

Figure 1:
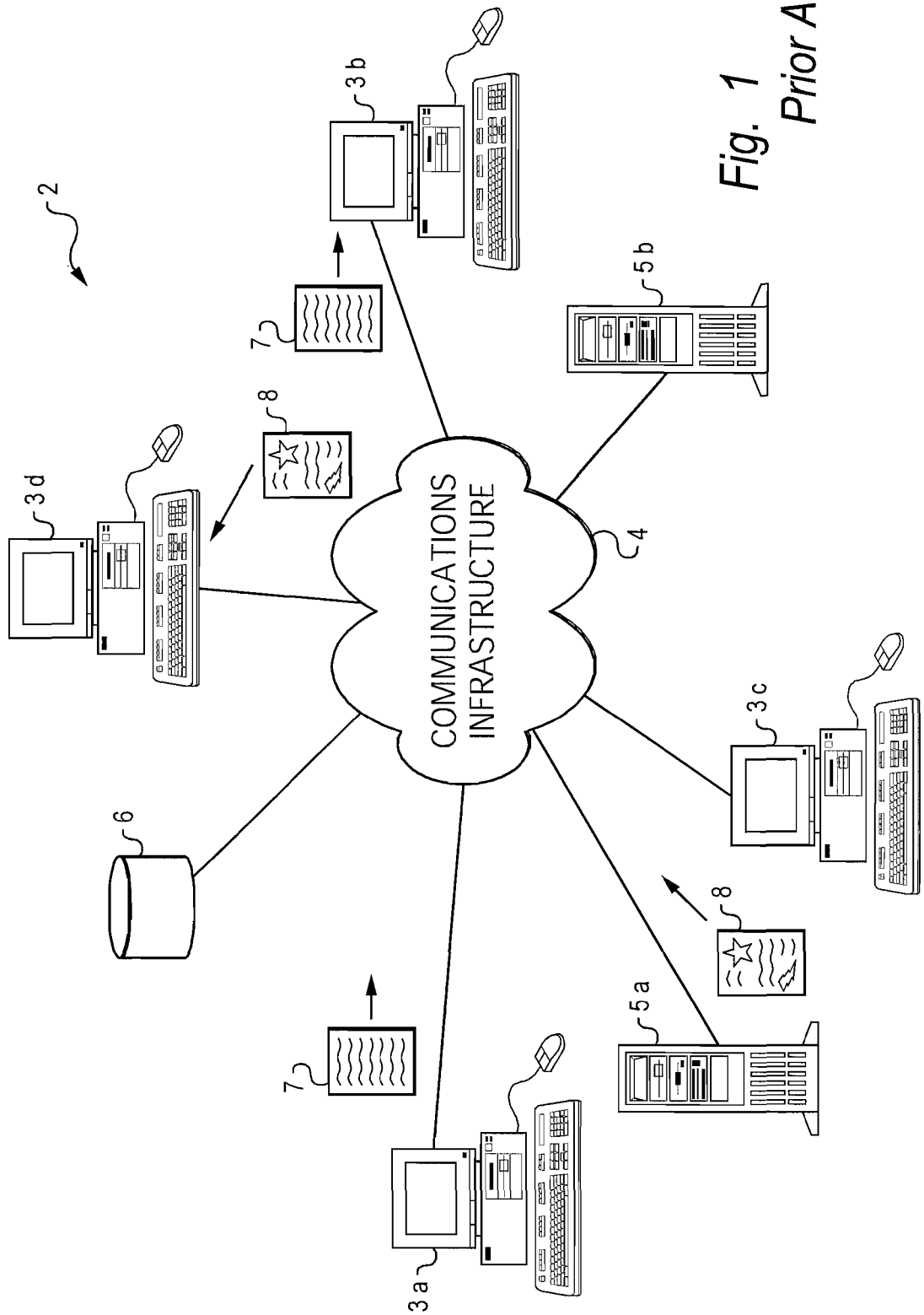
FIG. 1 is a pictorial representation of electronic document delivery across a conventional communications network having various nodes such as client workstations, servers, and storage devices.
Figure 2:
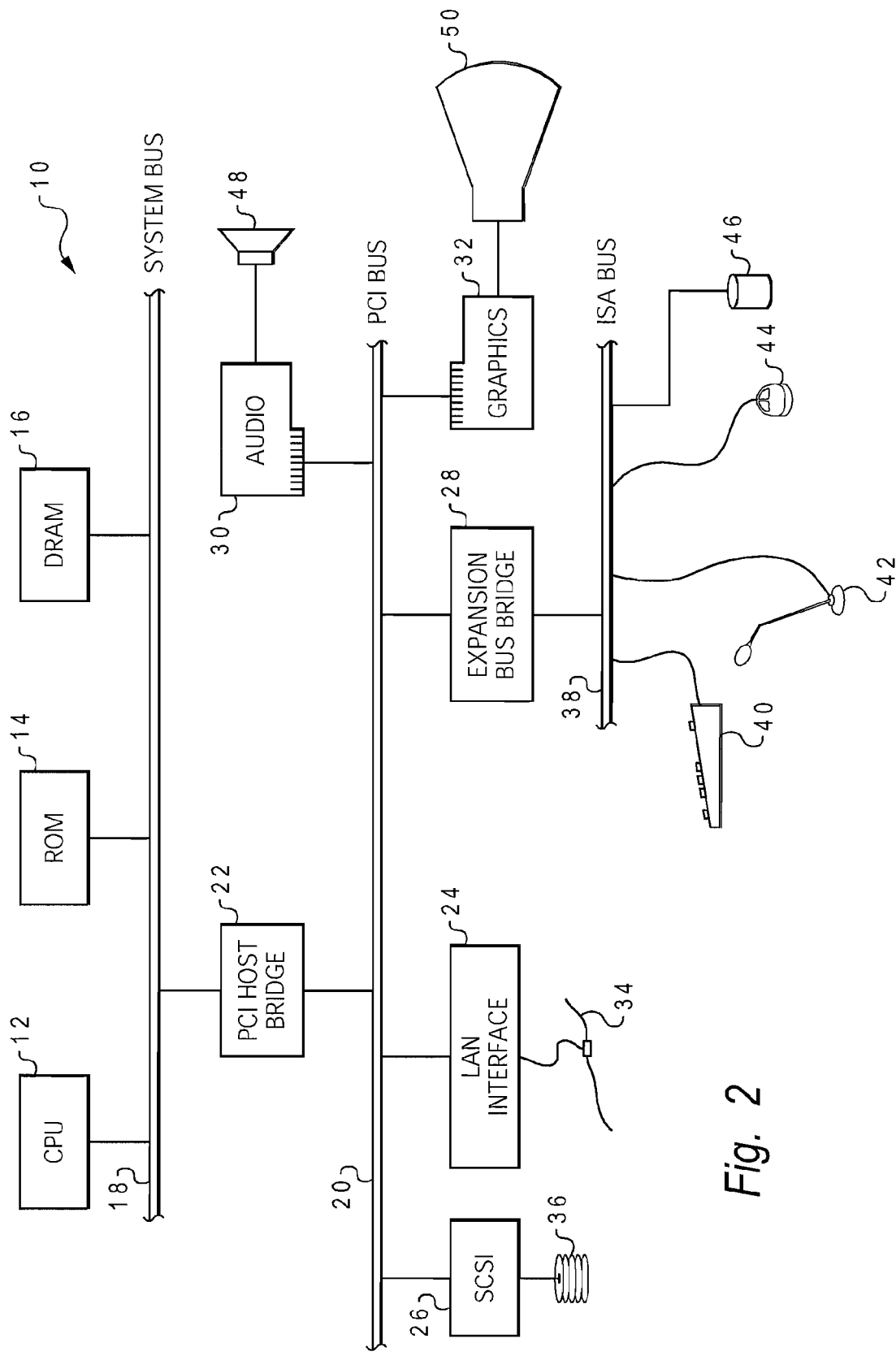
FIG. 2 is a block diagram of a computer system programmed to access remote network sites using associated persona preferences in accordance with one implementation of the present invention.

The present invention provides a method of switching between several internet "personas" which allows the computer user to effortlessly and transparently utilize different preferences depending upon the URL visited. Each persona contains a range of user preferences such as email addresses, cookie creation, Java permissions, etc. The invention utilizes a program application such as an enhanced web browser to store these preferences in association with the different URLs, as explained further below. The web browser is executed on a data processing system or computer. FIG. 2 depicts one embodiment 10 of a computer system programmed to automatically switch between different user personas in accordance with one implementation of the present invention.

System 10 includes a central processing unit (CPU) 12 which carries out program instructions, firmware or read-only memory (ROM) 14 which stores the system's basic input/output logic, and a dynamic random access memory (DRAM) 16 which temporarily stores program instructions and operand data used by CPU 12. CPU 12, ROM 14 and DRAM 16 are all connected to a system bus 18. There may be additional structures in the memory hierarchy which are not depicted, such as on-board (L1) and second-level (L2) caches.

CPU 12, ROM 14 and DRAM 16 are also coupled to a peripheral component interconnect (PCI) local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16. Attached to PCI local bus 20 are a network adapter 24, a small computer system interface (SCSI) adapter 26, an expansion bus bridge 28, an audio adapter 30, and a graphics adapter 32. Network adapter 24 may be used to connect computer system 10 to an external computer network 34, such as a local area network (LAN) or the Internet. Small computer system interface (SCSI) adapter 26 is used to control high-speed SCSI disk drive 36. Disk drive 36 stores the program instructions and data in a more permanent state, including the program which embodies the present invention as explained further below. Expansion bus bridge 28 is used to couple an industry standard architecture (ISA) expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50, to allow the user to control the document creation process as taught herein.

While the illustrative implementation provides the program instructions embodying the present invention on disk drive 36, those skilled in the art will appreciate that the invention can be embodied in a program product utilizing other non-transitory computer-readable media, excluding transitory media such as propagating signals.

Computer system 10 carries out program instructions for switching between different user personas when accessing web sites in accordance with one or more of the implementations discussed in detail below. Accordingly, practice of the invention may include the use of conventional web browser application features in addition to the inventive concept disclosed herein. The details of such applications will become readily apparent to those skilled in the art upon reference to this disclosure.

Figure 3:
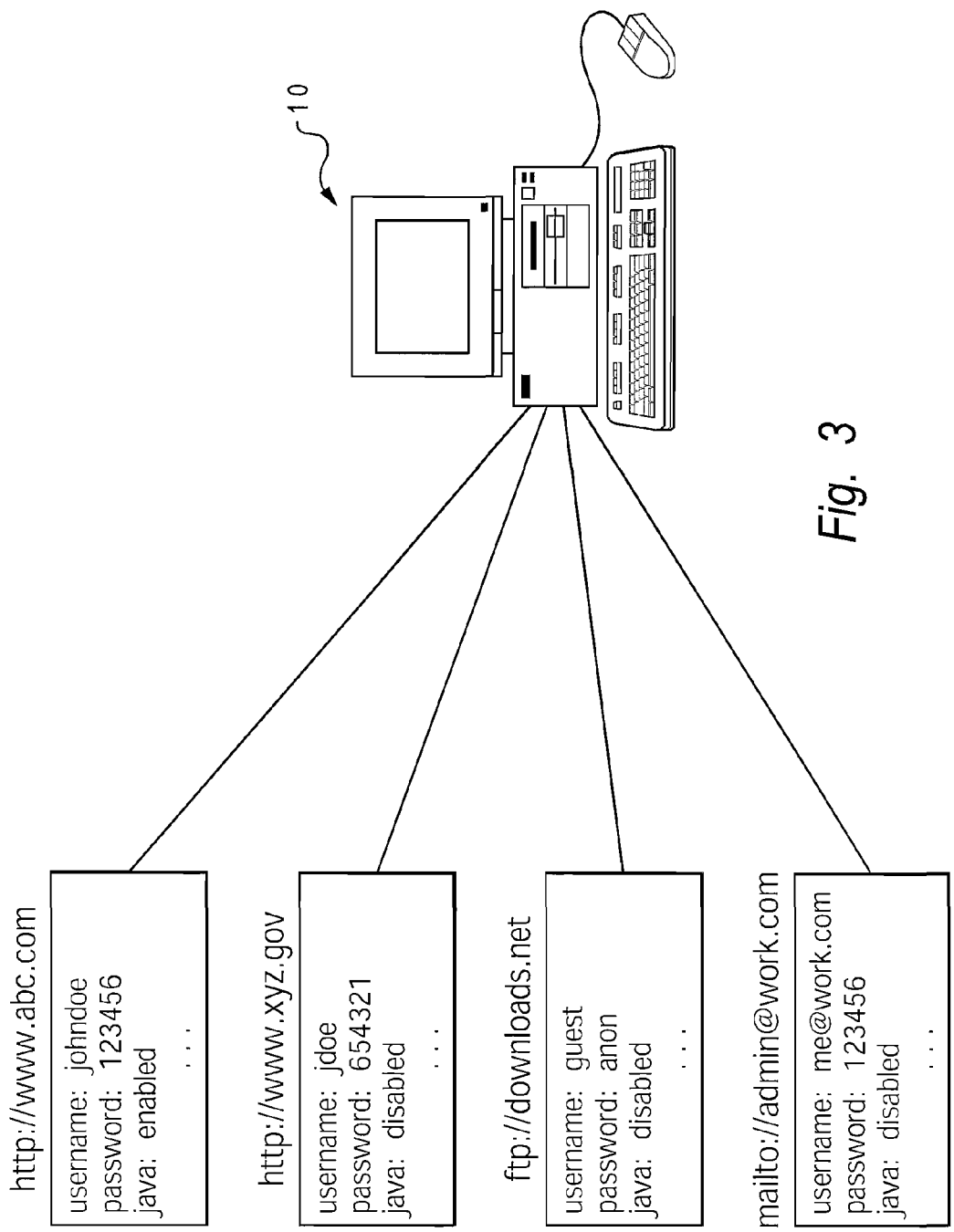
FIG. 3 is a pictorial representation of different persona preferences which have been selectively associated with different remote network sites (URLs) in accordance with one implementation of the present invention.

FIG. 3 is a pictorial representation of various user personas that are stored on computer 10 in association with respective URLs. The user preferences may be stored for example when a URL is first bookmarked. Then when a page is revisited, the page is matched against previously stored personas/URLs, and the appropriate user persona is automatically loaded by the web browser. FIG. 3 illustrates four such user personas. For the ABC Company web site (URL "http://www.abc.com"), the user has established a persona which includes a username "johndoe", a password "123456", and enables Java routines. For the XYZ government web site (URL "http://www.xyz.gov"), the user has established a persona which includes a username "jdoe", a password "654321", and disables Java routines. For the FTP download web site (URL "ftp://downloads.net"), the user has established a persona which includes a username "guest", a password "anon", and disables Java routines. For email sent to the administrator of the web site at the user's place of work (URL "mailto://admin@work.com"), the user has established a persona which includes a username (email address) "me@work.com", a password "123456", and disables Java routines (the mail server is the remote site in this case).

All four of these personas are accessible by the web browser running on computer system 10. In this manner, when the user initiates communication, e.g., by clicking on a web site bookmark or selecting an addressee for an email, the web browser can automatically locate and load the appropriate user persona without any additional effort on the part of the user.

Figure 4:
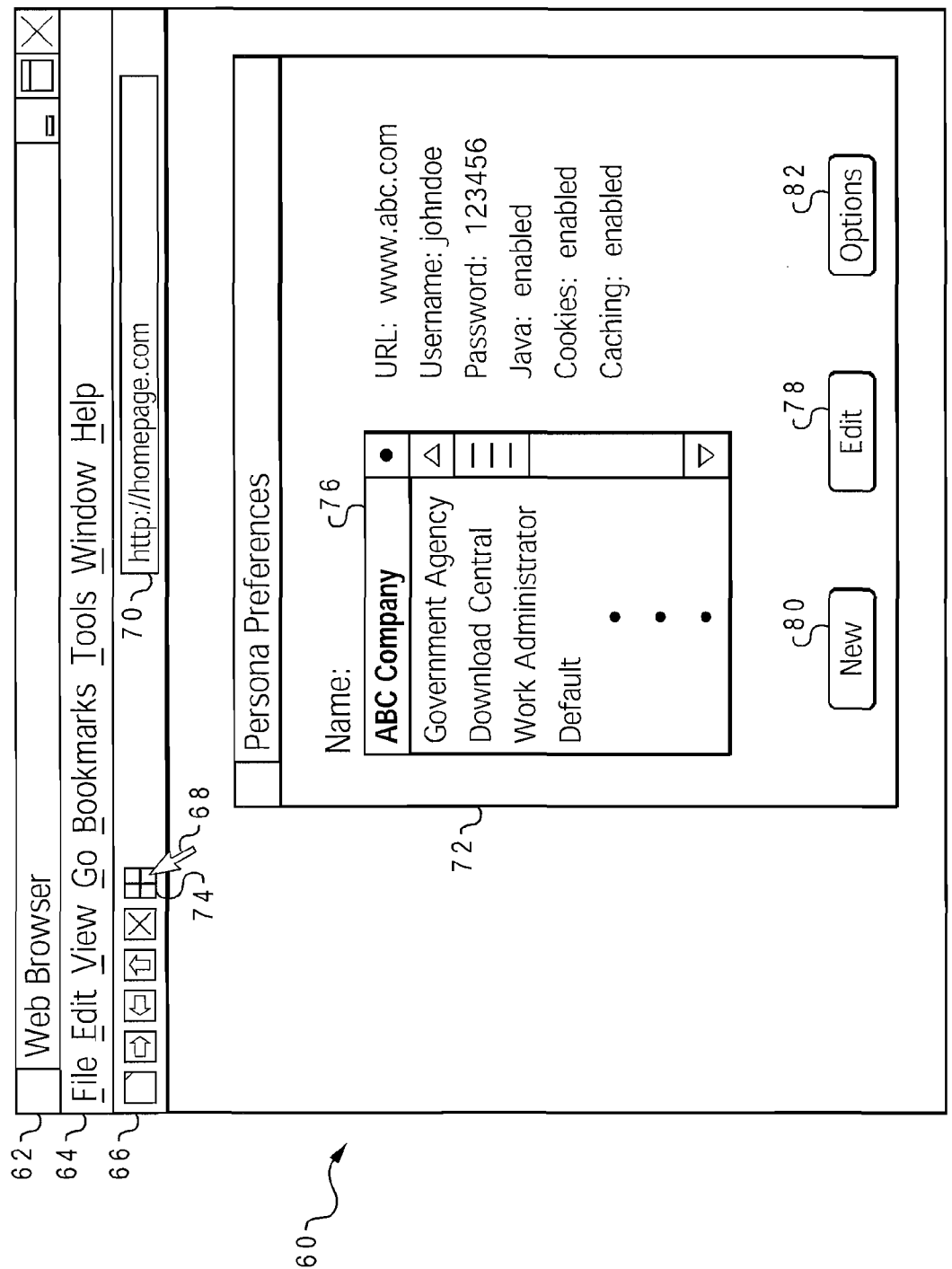
FIG. 4 is an elevational view of a web browser application as displayed on a computer screen, depicting a dialog box for viewing, entering or editing different persona preferences selectively associated with different remote network sites in accordance with one implementation of the present invention.

With further reference to FIG. 4, there is depicted one embodiment of a user interface 60 of the web browser that is displayed on monitor 50 as the electronic communication process is carried out by computer system 10 under control of the user. User interface 60 may include general features familiar to computer users such as a title bar 62, a menu bar 64 having various commands which can be executed using keyboard 40 or mouse 44 to display additional pull-down menus, and a button bar 66 having several graphical buttons with icons that allow the user to more simply effectuate a command with a single click of mouse 44 as it controls the graphical pointer 68 on display monitor 50, and a URL field 70 for manually typing in a URL.

Prior to initiating any specific communication, the user can establish different personas which are to be searched as a URL is entered to dynamically associate a given persona with a respective URL. FIG. 3 illustrates a query or dialog box 72 that is presented to the user in response to a command such as using mouse 40 to control graphical pointer 68 and click on a particular button 74 provided for the purpose of selecting such information sets. In the illustrative implementation, dialog box 72 allows the user to create, view and edit the preferences for each persona. A name field 76 shows various names or titles associated with various personas, with the name "ABC Company" selected. The associated persona preferences for the ABC Company are shown to the right of field 76, and include the URL, a username, a password, and enabling of Java, cookies and caching. The user can edit these preferences using the "Edit" button 78 which can present a further dialog box or interface (not shown) to allow the preferences to be modified. A "New" button 80 is similarly used to create a new persona. An "Options" button 82 can be used to set other general attributes used with persona preferences such as associating all URLs for a given site/domain with the chosen persona.

As seen in field 76, one of the personas may be designated as the "Default" persona. This persona is used for any URLs that are not explicitly specified in one of the other established personas.

Figure 5:
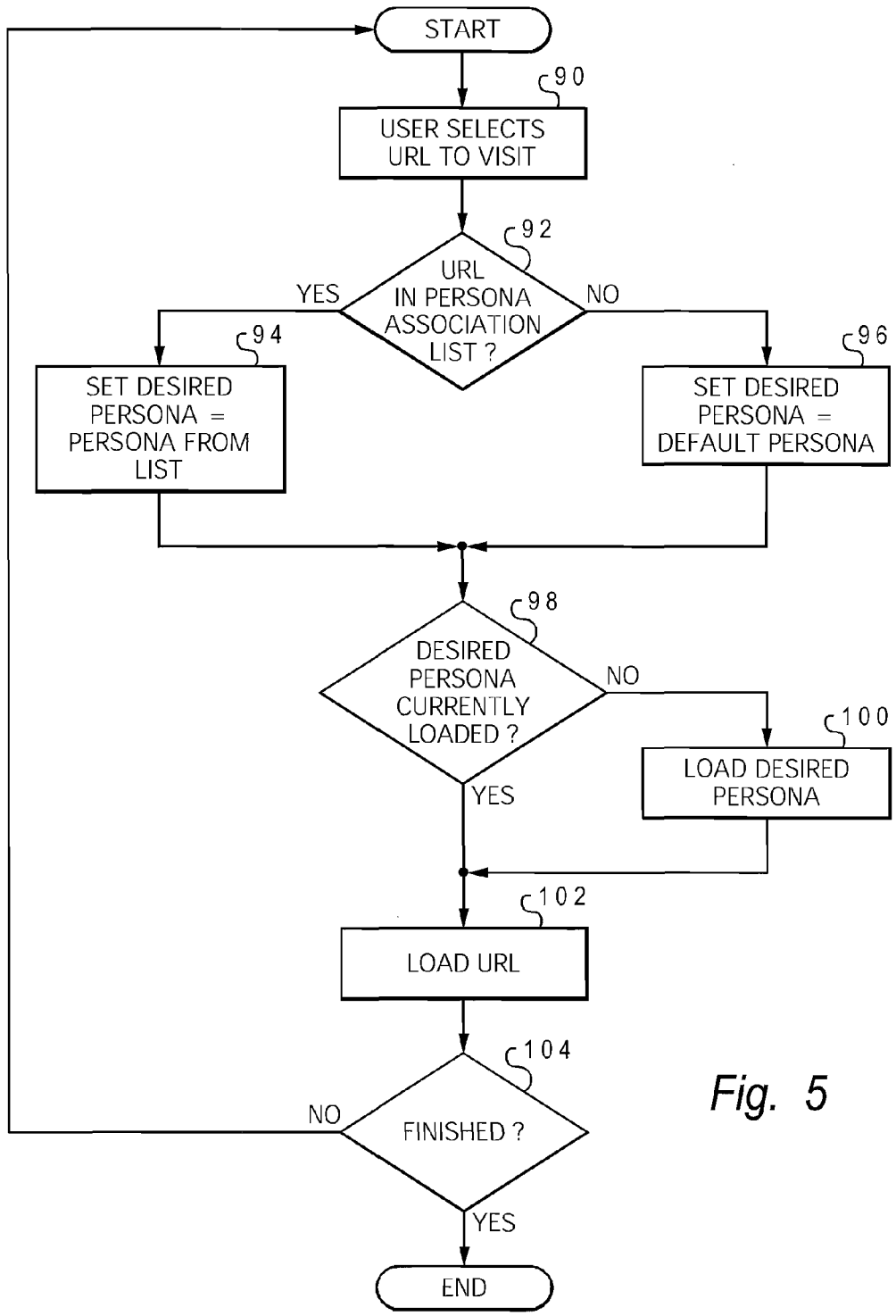
FIG. 5 is a chart illustrating the logical flow of remote site access using associated persona preferences in accordance with one implementation of the present invention.
Figure 6:
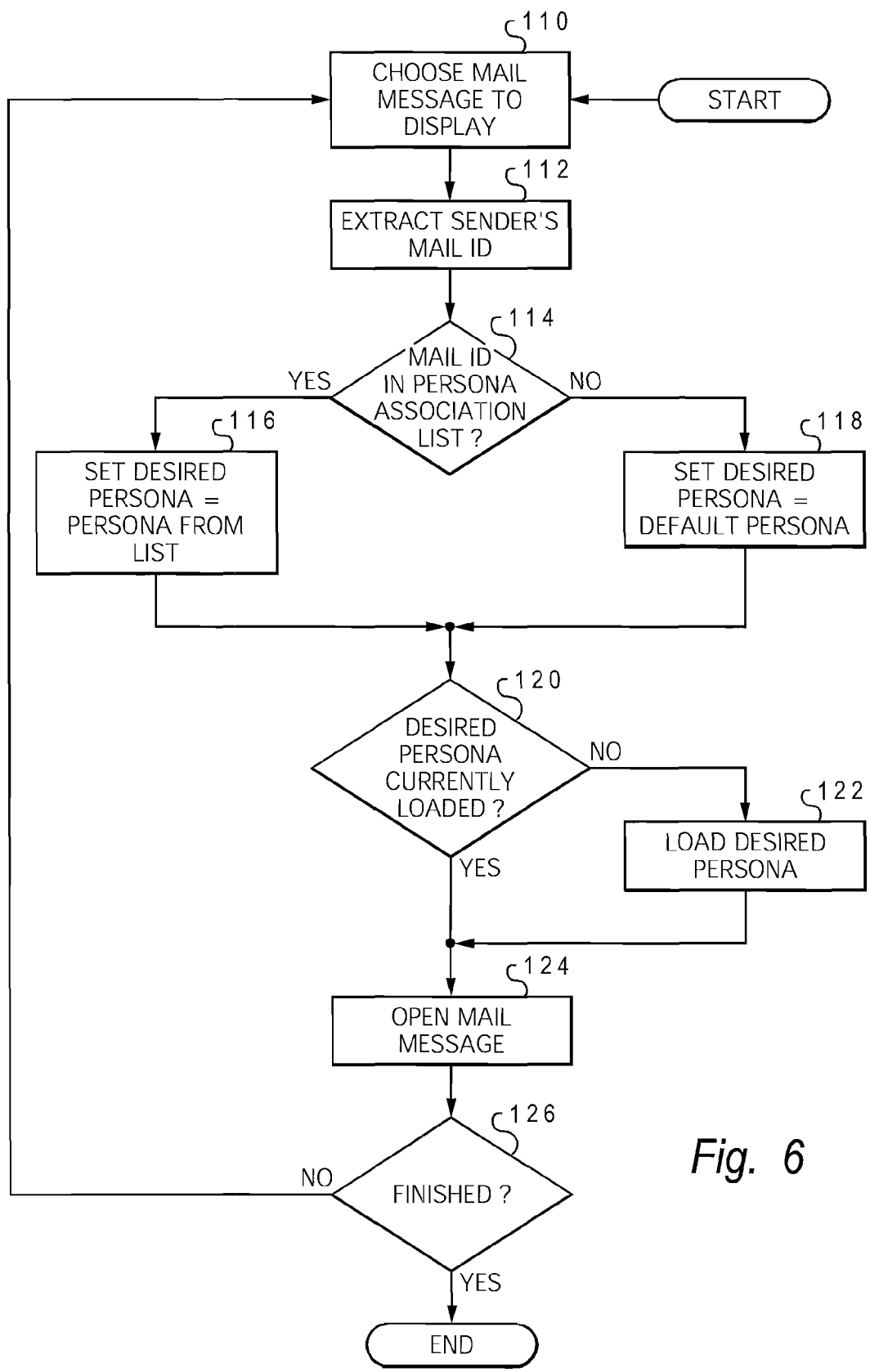
FIG. 6 is a chart illustrating the logical flow when a user opens an email message in accordance with one implementation of the present invention.
Figure 7:
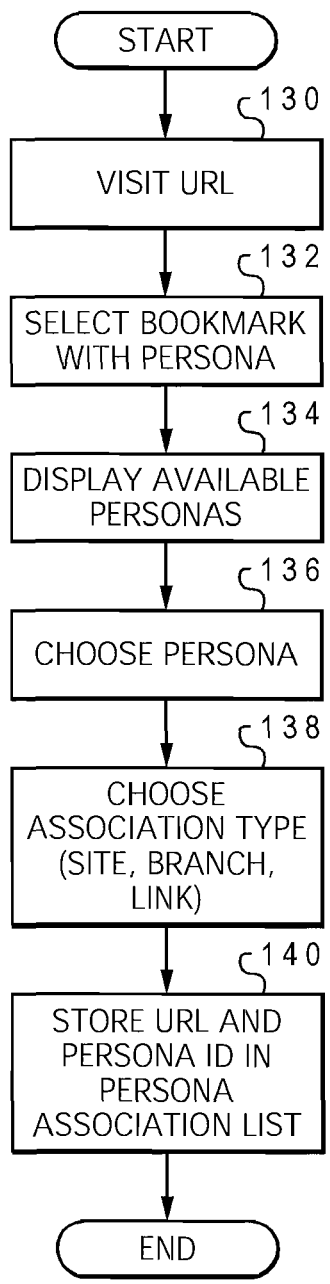
FIG. 7 is a chart illustrating the logical flow for associating a desired persona with a remote site when that site is bookmarked in accordance with one implementation of the present invention.

The present invention may be further understood with reference to the flow charts of FIGS. 5-7 which depict examples of accessing network sites in accordance with various implementations of the present invention. FIG. 5 illustrates the procedure for visiting a web site (URL), e.g., on the Internet, and begins when the user selects the particular URL to visit (90). The list of URLs for previously associated personas is reviewed to check for a match with the URL selected by the user (92). If the URL is on the list, the associated persona is loaded and set for accessing that URL (94). If the URL is not on the list, the default persona is used (96). If the default persona is being used, the user may want to associate a new persona with the site. Alternatively, if a previously associated persona is being used, the user may nevertheless want to change to a different persona. In either case, the procedure can make an inquiry as to whether the desired persona is currently loaded (98). If not, the user can load the desired persona (100), and the URL is then loaded by the web browser (102). This process continues iteratively for each URL selected to visit (104).

FIG. 6 illustrates an example of how a user might open an email message using the present invention. The procedure begins with the user selecting a mail message to read (110). The email ID (address) for the sender of the message is first extracted (112), and compared to the list of email addresses having previously associated personas (114). If the email address is on the list, the associated persona is loaded and set for viewing that message (116). If the address is not on the list, the default persona is used (118). The program can again query the user as to whether the desired persona is actually loaded (120). If not, the user is afforded an opportunity to load another desired persona (122). The email message is then opened using the appropriate persona (124). In this manner, the desired persona is used for any transactions involving that message, such as a return confirmation that is transmitted to the original email sender. The process continues iteratively for each mail message to be displayed (126).

FIG. 7 illustrates one manner to implement the invention for adding new bookmarks, including a "type" of association for a URL that indicates if all pages on the site should use the persona, or if only the pages subordinate to the current page (i.e., a branch of the site tree) should use the persona, or if just that specific page should use the persona. The process again begins when the user visits a site, i.e., enters a URL in a web browser (130). A bookmark is set for the URL (132), and a list of available personas is displayed which may be associated with it (134). The user then selects the desired persona (136), and further chooses are particular selection type as explained above (138). For example, a URL for a company's background information might be "http://www.abc.com/info" and, for such an address, the user could associate the persona with all addresses at that site (e.g., any address with the domain "http://www.abc.com"), or branches off the information page (e.g., any address beginning with "http://www.abc.com/info") or just the specific page bookmarked. The persona is then stored with a type indicator for the URL(s) as appropriate (140).

The present invention offers several advantages over convention network applications such as web browsers and email composes. A user is no longer required to continually modify preferences to allow specific sites/pages to have elevated privileges. It is also easier to protect sensitive information (e.g., email addresses) from site snoopers. Browser attributes are treated consistently and are not artificially separated into security-type preferences and user preferences.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of communicating with a remote site on a network, comprising:
   establishing a plurality of user personas respectively associated with a plurality of remote sites on the network, wherein the user personas contain one or more attributes including usernames and passwords which are used in accessing the remote sites, and selected remote sites are associated with the user personas by respective universal resource locators (URLs) stored with the user personas, the user personas including at least
   a first user persona having a first stored URL which is a hypertext protocol address and having attributes which further indicate whether Java programming is enabled for the hypertext protocol address and whether cookies are enabled for the hypertext protocol address,
   a second user persona having a second stored URL which is a file transfer protocol address,
   a third user persona having a third stored URL which is an email address, and
   a fourth user persona for default use in accessing any remote site having no other corresponding user persona; and
   after said establishing, selecting a specific remote site to access, the specific remote site having a particular URL;
   after said selecting the specific remote site to access, selecting a specific user persona by matching the particular URL of the specific remote site to a URL stored with a specific one of the user personas associated with the specific remote site; and
   in response to said matching, automatically accessing the specific remote site using the one or more attributes in the specific user persona.

2. The method of claim 1 wherein at least one of the user personas is established when a bookmark is created for the specific remote site.

3. A computer system comprising:
   means for processing program instructions;
   a memory device connected to said processing means; and
   program instructions residing in said memory device for establishing a plurality of user personas respectively associated with a plurality of remote sites on a network connected to the computer system, wherein the user personas contain one or more attributes including usernames and passwords which are used in accessing the remote sites, and selected remote sites are associated with the user personas by respective universal resource locators (URLs) stored with the user personas, the user personas including at least a first user persona having a first stored URL which is a hypertext protocol address and having attributes which further indicate whether Java programming is enabled for the hypertext protocol address and whether cookies are enabled for the hypertext protocol address, a second user persona having a second stored URL which is a file transfer protocol address, a third user persona having a third stored URL which is an email address, and a fourth user persona for default use in accessing any remote site having no other corresponding user persona, after the user personas are established selecting a specific remote site to access wherein the specific remote site has a particular URL, after the specific remote site to access is selected, selecting a specific user persona by matching the particular URL of the specific remote site to a URL stored with a specific one of the user personas associated with the specific remote site, and in response to the matching of the particular URL to the stored URL, automatically accessing the specific the remote site using the one or more attributes in the specific user persona.

4. The computer system of claim 3 wherein at least one of the user personas is established when a bookmark is created for the specific remote site.

5. A computer program product comprising:
   a non-signal computer-readable storage medium; and
   program instructions residing in said storage medium for establishing a plurality of user personas respectively associated with a plurality of remote sites on a network connected to a computer system, wherein the user personas contain one or more attributes including usernames and passwords which are used in accessing the remote sites, and selected remote sites are associated with the user personas by respective universal resource locators (URLs) stored with the user personas, the user personas including at least a first user persona having a first stored URL which is a hypertext protocol address and having attributes which further indicate whether Java programming is enabled for the hypertext protocol address and whether cookies are enabled for the hypertext protocol address, a second user persona having a second stored URL which is a file transfer protocol address, a third user persona having a third stored URL which is an email address, and a fourth user persona for default use in accessing any remote site having no other corresponding user persona, after the user personas are established selecting a specific remote site to access wherein the specific remote site has a particular URL, after the specific remote site to access is selected, selecting a specific user persona by matching the particular URL of the specific remote site to a URL stored with a specific one of the user personas associated with the specific remote site, and in response to the matching of the particular URL to the stored URL, automatically accessing the specific remote site using the one or more attributes in the specific user persona.

6. The computer program product of claim 5 wherein at least one of the user personas is established when a bookmark is created for the specific remote site.

* * * * *